(12) United States Patent
Ren et al.

(10) Patent No.: US 11,836,186 B2
(45) Date of Patent: Dec. 5, 2023

(54) METHOD AND APPARATUS FOR RETRIEVING IMAGE, DEVICE, AND MEDIUM

(71) Applicant: BEIJING BAIDU NETCOM SCIENCE AND TECHNOLOGY CO., LTD., Beijing (CN)

(72) Inventors: Hui Ren, Beijing (CN); Min Yang, Beijing (CN); Xuetong Xue, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 319 days.

(21) Appl. No.: 17/208,901

(22) Filed: Mar. 22, 2021

(65) Prior Publication Data

US 2021/0209408 A1    Jul. 8, 2021

(30) Foreign Application Priority Data

Apr. 23, 2020   (CN) .......................... 202010327963.8

(51) Int. Cl.
*G06K 9/62* (2022.01)
*G06K 9/46* (2006.01)
(Continued)

(52) U.S. Cl.
CPC .......... *G06F 16/583* (2019.01); *G06F 18/231* (2023.01); *G06N 3/02* (2013.01);
(Continued)

(58) Field of Classification Search
CPC ... G06F 16/583; G06F 18/231; G06V 10/454; G06V 10/82; G06V 10/751; G06V 10/7625; G06V 30/248; G06N 3/02
See application file for complete search history.

(56) References Cited

U.S. PATENT DOCUMENTS

| 2019/0005069 A1 | 1/2019 | Filgueiras de Araujo et al. |
| 2020/0019807 A1* | 1/2020 | Ma .................... G06V 30/19173 |
| 2020/0117951 A1 | 4/2020 | Li et al. |

FOREIGN PATENT DOCUMENTS

| CN | 101777059 A | 7/2010 |
| CN | 102542058 A | 7/2012 |

(Continued)

OTHER PUBLICATIONS

Kuric et al, "ANNOR: Efficient image annotation based on combining local and global features", 2015, Computers & Graphics 47 (15 pages) (Year: 2015).*

(Continued)

*Primary Examiner* — David F Dunphy
(74) *Attorney, Agent, or Firm* — Lippes Mathias LLP

(57) ABSTRACT

A method for retrieving an image is provided. The method includes: extracting a global feature and a local feature of an image to be retrieved, and a global feature and a local feature of an image to be recalled by employing a preset neural network model; determining a candidate image set by matching the global feature of the image to be retrieved with the global feature of the image to be recalled and matching the local feature of the image to be retrieved with the local feature of the image to be recalled; and determining a retrieval result from the candidate image set by performing local feature verification on the image to be retrieved and a candidate image in the candidate image set. An apparatus for retrieving an image, an electronic device, and a medium are further provided.

17 Claims, 4 Drawing Sheets

(51) Int. Cl.
*G06N 3/02* (2006.01)
*G06F 16/583* (2019.01)
*G06F 18/231* (2023.01)
*G06V 30/24* (2022.01)
*G06V 10/75* (2022.01)
*G06V 10/762* (2022.01)
*G06V 10/82* (2022.01)
*G06V 10/44* (2022.01)

(52) U.S. Cl.
CPC .......... *G06V 10/454* (2022.01); *G06V 10/751* (2022.01); *G06V 10/7625* (2022.01); *G06V 10/82* (2022.01); *G06V 30/248* (2022.01)

(56) References Cited

FOREIGN PATENT DOCUMENTS

| | | |
|---|---|---|
| CN | 103226589 A | 7/2013 |
| CN | 109508681 A | 3/2019 |
| CN | 109871909 A | 6/2019 |
| CN | 110119460 A | 8/2019 |
| CN | 110348282 A | 10/2019 |
| JP | 2010250633 A | 11/2010 |
| JP | 2010266964 A | 11/2010 |
| JP | 2013092941 A | 5/2013 |
| JP | 2014178857 A | 9/2014 |
| JP | 2019016268 A | 1/2019 |

OTHER PUBLICATIONS

Office Action for Japanese Application No. 2021-051249, dated Apr. 5, 2022, 5 pages.
Hyeonwoo Noh et al., "Large-Scale Image Retrieval with Attentive Deep Local Features", IEEE International Conference on Computer Vision, Oct. 22, 2017, pp. 3476-3485.
Shigeo Yamato et al., "The proposal of the high-speed object detection technique by Attention and meaning information reinforcement processing", DEIM Forum 2020 F6-2, Mar. 4, 2020, 13 pages.
P.W. Huang et al., "Design of a two-stage content-based image retrieval system using texture similarity", Information Processing and Management 40, Jan. 31, 2004, pp. 81-96.
Prof. Dr. Thomas Ottman et al., "Feature Histograms for Content-Based Image Retrieval", Disseration, Dec. 19, 2002, 150 pages.
Vikas Verma, "Image Retrieval and Classification Using Local Feature Vectors", Department of Computer Science & Engineering Indian Institute of Technology Madras, Sep. 2, 2014, 97 pages.
Hyeonwoo Noh et al., "Image Retrieval with Deep Local Features and Attention-based Keypoints", Printed off the Internet, Dec. 19, 2016, 12 pages.
Wengang Zhou, "Recent Advance in Content-based Image Retrieval: A Literature Survey", Printed off the Internet, Sep. 2, 2017, 22 pages.
Tang Qian et al., "Two-step matching strategy combining global-local descriptor", Proc. SPIE 10033, Eighth International Conference on Digital Image Processing, Aug. 29, 2016, 6 pages.
Extended European Search Report for Application No. 21164349.9, dated Sep. 21, 2021, 11 pages.
Office Action for Chinese Application No. 202010327963.8, dated Feb. 25, 2023, 21 pages.

\* cited by examiner

METHOD AND APPARATUS FOR RETRIEVING IMAGE, DEVICE, AND MEDIUM

CROSS-REFERENCE TO RELATED APPLICATIONS

This application is based upon and claims benefit of priority to a Chinese Patent Application 202010327963.8, filed on Apr. 23, 2020, the entire contents of which are incorporated herein by reference.

FIELD

Embodiments of the disclosure relate to computer technologies and particularly to intelligent search technologies, and particularly relate to a method and an apparatus for retrieving an image, a device, and a medium.

BACKGROUND

Image retrieval refers to searching an image result exactly same as an object in an image (or an image to be retrieved) requested by a user, or searching an image exactly same as the image requested by the user from an image database with a certain amount of images. Presently, a common solution for retrieving the image includes: a retrieval method for extracting an image feature based on an image feature descriptor, and a method for extracting a global feature of the image for the image retrieval based on a convolutional neural network model.

However, the retrieval method for extracting the image feature based on the image feature descriptor is generally suitable for a situation where a viewpoint and an illumination do not change large between images, and the retrieval efficiency and accuracy may not be guaranteed when there is a large number of images. An existing method for retrieving the image based on the convolution neural network model has a high retrieval efficiency, but does not have an ideal retrieval accuracy.

SUMMARY

Embodiments of the disclosure provide a method and an apparatus for retrieving an image, a device, and a medium.

In a first aspect, embodiments of the disclosure provide a method for retrieving an image. The method includes: extracting a global feature and a local feature of an image to be retrieved, and a global feature and a local feature of an image to be recalled by employing a preset neural network model; determining a candidate image set by matching the global feature of the image to be retrieved with the global feature of the image to be recalled and matching the local feature of the image to be retrieved with the local feature of the image to be recalled; and determining a retrieval result from the candidate image set by performing local feature verification on the image to be retrieved and a candidate image in the candidate image set.

In a second aspect, embodiments of the disclosure further provide an apparatus for retrieving an image. The apparatus includes: a feature extracting module, a feature matching module, and a retrieval result determining module. The feature extracting module is configured to extract a global feature and a local feature of an image to be retrieved, and a global feature and a local feature of an image to be recalled by employing a preset neural network model. The feature matching module is configured to determine a candidate image set by matching the global feature of the image to be retrieved with the global feature of the image to be recalled and matching the local feature of the image to be retrieved with the local feature of the image to be recalled. The retrieval result determining module is configured to determine a retrieval result from the candidate image set by performing local feature verification on the image to be retrieved and a candidate image in the candidate image set.

In a third aspect, embodiments of the disclosure further provide an electronic device. The electronic device includes: at least one processor and a memory. The memory is communicatively coupled to the at least one processor. The memory is configured to store instructions executable by the at least one processor. The instructions are executed by the at least one processor to cause the at least one processor to perform the method for retrieving the image according to any one of embodiments of the disclosure.

In a fourth aspect, embodiments of the disclosure further provide a non-transitory computer readable storage medium having computer instructions stored thereon. The computer instructions are configured to cause a computer to perform the method for retrieving the image according to any one of embodiments of the disclosure.

It should be understood that the content described in the Summary is not intended to identify the key or important features of embodiments of the disclosure, nor is it intended to limit the scope of the disclosure. Other features of the disclosure may be easily understood through the following description.

BRIEF DESCRIPTION OF THE DRAWINGS

The accompanying drawings are used for better understanding the solution and do not constitute a limitation of the disclosure.

DETAILED DESCRIPTION

Description will be made below to exemplary embodiments of the disclosure with reference to accompanying drawings, which includes various details of embodiments of the disclosure to facilitate understanding and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

Figure 1:
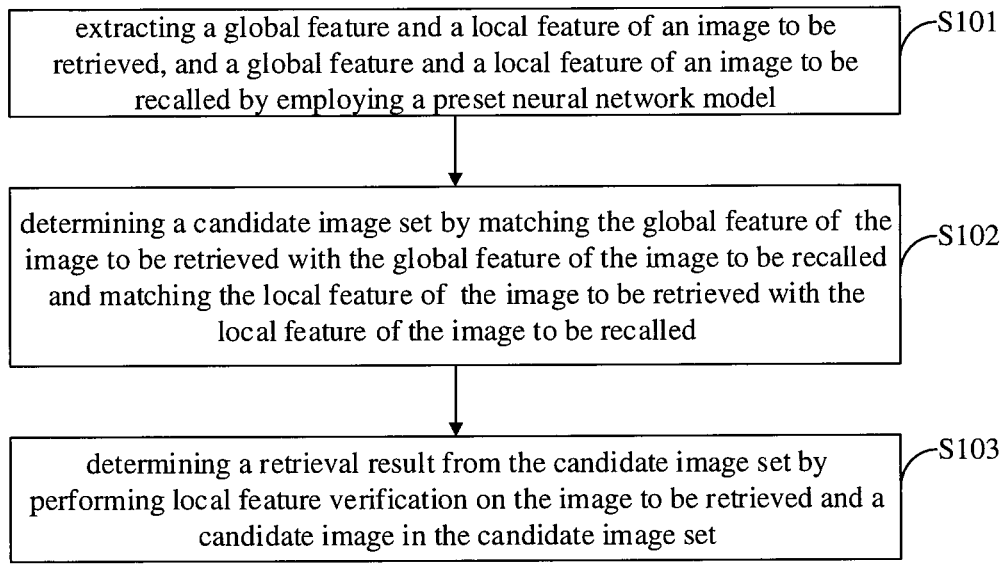
FIG. 1 is a flowchart illustrating a method for retrieving an image according to an embodiment of the disclosure.

FIG. 1 is a flowchart illustrating a method for retrieving an image according to an embodiment of the disclosure. The embodiment of the disclosure may be applied to a situation where image retrieval or search is performed based on a request image inputted by a user. The method may be executed by an apparatus for retrieving an image. The apparatus may be implemented by software and/or hardware, and integrated in any electronic device with numeracy, such as a server.

Exemplarily, scenes having same or similar image retrieval requirements may include, but be not limited to, the followings.

1) Reviewing of repeated images in a specific enterprise or company. For example, different customers of an insurance company may use the same image with a vehicle replaced in a way of image editing processing, to defraud an insurance amount. The insurance company has a requirement for retrieving the image containing the same vehicle.

2) Replacing of a raw image with a high-definition image. A high-definition image corresponding to a low-resolution image is retrieved from a database by utilizing a retrieval system, and the low-resolution image is replaced with the high definition image.

As illustrated in FIG. 1, the method for retrieving the image according to an embodiment of the disclosure may include the followings.

At block S101, a global feature and a local feature of an image to be retrieved, and a global feature and a local feature of an image to be recalled are extracted by employing a preset neural network model.

The preset neural network model is a pre-trained network model for extracting the global feature and the local feature of the image, which may be implemented based on a convolutional neural network (CNN). A detailed training process of a network model having a function of extracting an image feature is not limited in embodiments of the disclosure, and may be implemented with reference to an existing model training principle in an image processing field.

In embodiments of the disclosure, a same neural network model is utilized to perform feature processing on the image to be retrieved and the image to be recalled. The image to be recalled refers to an image resource in the database. The global feature of any image may be represented by a fixed-length vector. For example, any image corresponds to a 256-dimensional vector. The local feature of any image may be represented by a preset number of feature points. For example, any image corresponds to feature points the number of which is less than 600, and each feature point is a 64-bit description space. Therefore, the local feature of the image may be represented as a matrix with dimensions of [600, 64]. In detail, the local feature corresponds to a specific object existing in the image. For example, for an image containing a wine glass, the local feature of the image may be used to characterize a position of the wine glass on the image.

At block S102, a candidate image set is determined by matching the global feature of the image to be retrieved with the global feature of the image to be recalled and matching the local feature of the image to be retrieved with the local feature of the image to be recalled.

In detail, the images to be recalled may be preliminarily screened by global feature matching, and then an image set after the preliminary screening may be further screened by local feature matching, that is, refined comparison may be performed on the similarity of the images, to obtain the candidate image set. Exemplarily, determining the candidate image set by matching the global feature of the image to be retrieved with the global feature of the image to be recalled and matching the local feature of the image to be retrieved with the local feature of the image to be recalled may include: determining a recall image set by matching the global feature of the image to be retrieved with the global feature of the image to be recalled; and determining the candidate image set by matching the local feature of the image to be retrieved with a local feature of a recall image in the recall image set. The candidate image set is equivalent to an image retrieval result preliminarily determined in the embodiment of the disclosure.

The global feature matching between different images may be implemented by calculating a distance between vectors, such as a cosine distance calculation. When the distance between two vectors is lower than a first distance threshold, it may be considered that the global features of the two corresponding images are matched successfully. When the distance between the two vectors is greater than or equal to the first distance threshold, it may be considered that the global features of the two corresponding images are not matched successfully. The local feature matching between different images may also be implemented by calculating a distance between feature points. For example, when the number of feature point pairs with a feature distance lower than a second distance threshold is greater than or equal to a number threshold, it may be considered that local features of the two images are matched successfully; otherwise, it may be considered that local features of the two images are not matched. The first distance threshold, the second distance threshold and the number threshold may be flexibly set based on a requirement. The global feature and the refined local feature of the image are comprehensively considered during the image retrieval, thereby facilitating to improve the accuracy of the image retrieval.

In some embodiments, before the recall image set is determined by matching the global feature of the image to be retrieved with the global feature of the image to be recalled, the method according to embodiments of the disclosure may also include: compressing the global feature of the image to be retrieved and the global feature of the image to be recalled. For example, in an existing solution, the global feature of the image is generally stored in a float point type and used in the cosine distance calculation. In embodiments of the disclosure, the global feature in the float point type is compressed into a feature in a char type by performing the feature compression processing. For example, each float expression space may be quantized and compressed to an expression space of [−127,128], and an original feature in the size of float is compressed to a feature occupying 1 byte, such that a feature storage space occupies ¼ of the original size, that is, a storage space of the global feature only needs ¼ of an original storage space after the feature compression processing. Especially in a super-large-scale (over ten million orders of magnitude) retrieval system, by performing the feature compression processing, the storage space occupied by the image feature may be reduced, a time-consuming of feature matching is reduced, the speed of the image retrieval is improved, and the retrieval performance is optimized.

At block S103, a retrieval result is determined from the candidate image set by performing local feature verification on the image to be retrieved and a candidate image in the candidate image set.

The local feature verification aims to further verify whether the candidate image in the candidate image set and the image to be retrieved display a same object, or whether the candidate image and the image to be retrieved belong to a same image. The local feature verification may be implemented in a way different from the way used in the local feature matching. For example, the local feature verification may be implemented based on a geometric consistency check between feature points of the image to be retrieved and feature points of the image to be recalled.

In the existing retrieval system, in order to ensure a high recall rate for the image, the retrieval accuracy rate is generally sacrificed and the further verification of the local feature is omitted. In this embodiment, the image retrieval accuracy is first considered, and the recall rate of the image retrieval is improved on the basis of ensuring the retrieval accuracy rate.

Figure 2:
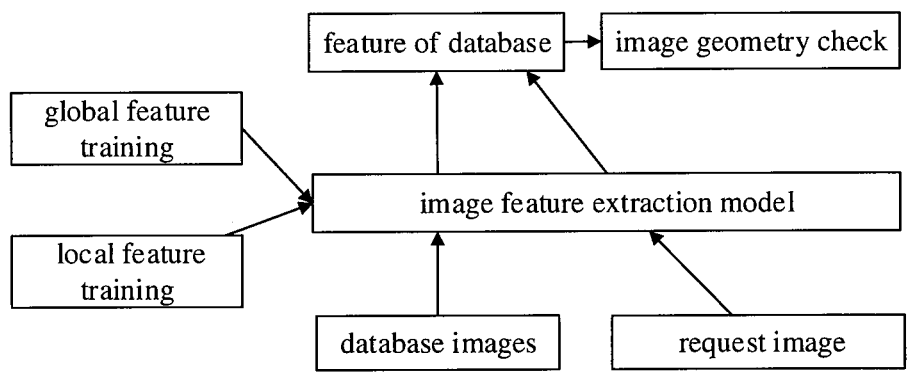
FIG. 2 is a schematic diagram illustrating a method for retrieving an image according to an embodiment of the disclosure.

FIG. 2 is a schematic diagram illustrating a method for retrieving an image according to an embodiment of the disclosure, which should not be understood as a detailed limitation of embodiments of the disclosure. As illustrated in FIG. 2, before the image retrieval, global feature training and local feature training need to be performed on the image to obtain an image feature extraction model (i.e., the preset neural network model described above). A database image (i.e., the image to be recalled) and a request image (i.e., the image to be retrieved) are taken as inputs of the image feature extraction model. A global feature and a local feature of the database image and a global feature and a local feature of the request image are obtained after processing of the image feature extraction model. Then, a retrieval result matching the request image is obtained in combination with an image geometry check, and the retrieval result is fed back to the user.

With the technical solution according to embodiments of the disclosure, during the image retrieval, both the global feature and the local feature of the image are extracted by utilizing the preset neural network model. Comparing with employing an image feature descriptor such as a regular SIFT (scale invariant feature transform) descriptor to extract the image feature, employing the neural network model to extract the global feature and the local feature of the image is applicable to more image types. Even if there is a big difference in shooting illumination and shooting viewpoint, the neural network model may effectively extract the image feature, which lays a foundation for the subsequent implementation of image retrieval with a higher performance. The preliminary image retrieval result is obtained by considering both the global feature and the local feature of the image, and then the final image retrieval result is obtained by performing the local feature verification, thereby solving a problem that the accuracy of the existing image retrieval is low, improving the accuracy of the image retrieval while ensuring the retrieval efficiency for a large number of database images, and further achieving a higher retrieval performance.

On the basis of the above technical solution, in some embodiments, extracting the global feature and the local feature of the image to be retrieved and the global feature and the local feature of the image to be recalled by employing a preset neural network model includes: extracting the global feature of the image to be retrieved and the global feature of the image to be recalled by employing a residual neural network model; and extracting the local feature of the image to be retrieved and the local feature of the image to be recalled by employing the residual neural network model and an attention model.

Exemplarily, a depth residual network model, such as ResNet50_vd, may be employed during extracting the global feature of the image. A loss function used during training the depth residual network model is an arcmargin loss function. Comparing with generally employing the Softmax function to train the model and using a cross entropy loss function which may not enlarge a distance between feature classes and reduce a distance within a class in the existing retrieval system, by employing the arcmargin loss function and adding a certain margin between feature classes, a training accuracy of a global convolutional neural network model may be improved, and the accuracy of the feature extraction is ensured.

Further, an output layer of the residual neural network model is used as an input layer of the attention model during extracting the local feature of the image to be retrieved and the local feature of the image to be recalled. For example, an input of conv3 layer may be connected to an attention layer on the basis of fixing backbone of resnet50, to achieve a purpose of selecting the feature points on a feature map. Different from the existing solution of extracting the local feature by employing a specific interest region selected on the image, local feature points may be directly selected based on a feature map corresponding to a complete image in the embodiment of the disclosure, thereby ensuring the accuracy and reliability of the local feature extraction.

In an embodiment of the disclosure, during performing model training for extracting the local feature of an image, feature class information is employed to guide an output layer of the residual neural network to automatically learn a focus area of each feature class, and then the attention model is employed to automatically extract the feature points with high response from the output layer of the residual neural network. For a detailed implementation of the attention model, reference can be made to an implementation principle of the existing attention model, which may not be described in detail in the embodiment of the disclosure.

In addition, it should be noted that, the global feature and the local feature of the image to be retrieved and the global feature and the local feature of the image to be recalled may be extracted at the same time or not at the same time, which is not limited herein. For example, the recall image set may be determined firstly by matching the global feature of the image to be retrieved and the global feature of the image to be recalled, and then the local feature of a recall image in the recall image set and the image to be retrieved may be extracted.

Figure 3:
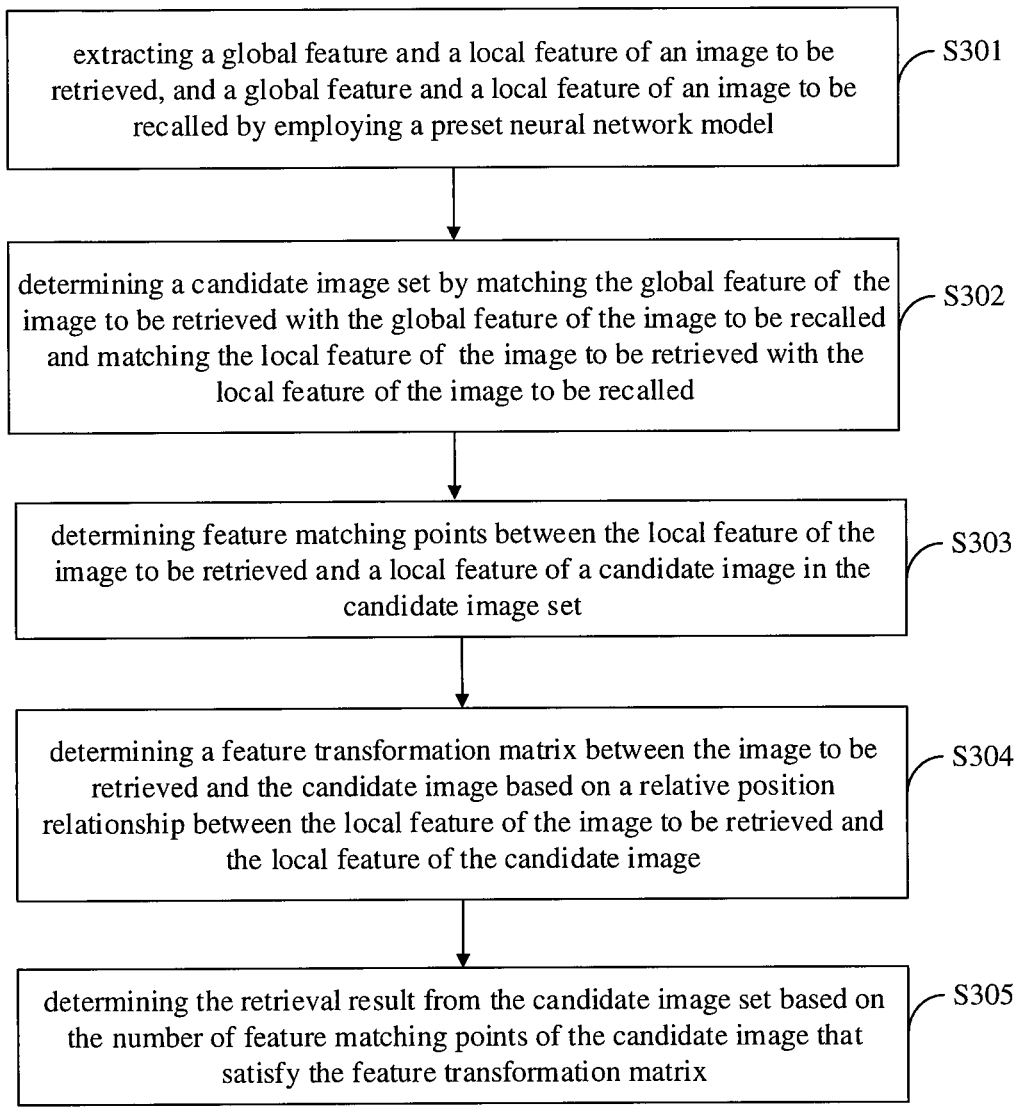
FIG. 3 is a flowchart illustrating a method for retrieving an image according to another embodiment of the disclosure.

FIG. 3 is a flowchart illustrating a method for retrieving an image according to another embodiment of the disclosure. The technical solution may be further optimized and expanded based on the above technical solution, and may be combined with the above alternative embodiments. As illustrated in FIG. 3, the method may include the followings.

At block S301, a global feature and a local feature of an image to be retrieved, and a global feature and a local feature of an image to be recalled are extracted by employing a preset neural network model.

At block S302, a candidate image set is determined by matching the global feature of the image to be retrieved with the global feature of the image to be recalled and matching the local feature of the image to be retrieved with the local feature of the image to be recalled.

The candidate image set is equivalent to the image retrieval result preliminarily determined in the embodiment of the disclosure.

At block S303, feature matching points between the local feature of the image to be retrieved and a local feature of a candidate image in the candidate image set are determined.

Exemplarily, a distance between a local feature point of the image to be retrieved and a local feature point of the candidate image in the candidate image set may be calculated by employing any available formula for calculating a distance between feature points. A feature point pair with the distance lower than a second distance threshold is determined as the feature matching points of the image to be retrieved and the image to be recalled. The second distance threshold may be adaptively set.

At block S304, a feature transformation matrix between the image to be retrieved and a candidate image is determined based on a relative position relationship between the local feature of the image to be retrieved and the local feature of the candidate image.

The feature transformation matrix satisfied by most local feature points in the image to be retrieved and the candidate image may be determined by using statistics based on the relative position relationship between the local feature of the image to be retrieved and the local feature of the candidate image. Then the number of feature matching points satisfying the feature transformation matrix is determined. Exemplarily, the feature transformation matrix between the image to be retrieved and the candidate image may be determined by employing findHomography function on the basis of a random sample consensus (RANSAC).

At block S305, the retrieval result is determined from the candidate image set based on the number of feature matching points of the candidate image satisfying the feature transformation matrix.

The more the feature matching points in the candidate image that satisfy the feature transformation matrix, the higher a probability that the candidate image and the image to be retrieved have the same object or belong to the same image. Exemplarily, after the number of feature matching points of the candidate image that satisfy the feature transformation matrix is determined, the candidate images are sored based on the number of the feature matching points in a descending order, and a pre-set number of high-ranking candidate images are determined as the retrieval result. Alternatively, one or more candidate images with the number of the feature matching points satisfying the feature transformation matrix greater than a number threshold may be determined as the retrieval result.

According to the technical solution of embodiments of the disclosure, both the global feature and the local feature of the image are extracted by employing the preset neural network model during the image retrieval. Comparing with employing the image feature descriptor to extract the image feature, the preset neural network model is applicable to a wider range of image types, and may effectively extract the image feature, to lay a foundation for subsequently implementing image retrieval with a higher performance. The candidate image set is determined by considering both the global feature and the local feature of the image. And the final image retrieval result is obtained based on the number of feature matching points of the candidate image satisfying the feature transformation matrix. In this way, the problem that the accuracy of the existing image retrieval is low is solved. For a large number of database images, the accuracy of the image retrieval is improved while the retrieval efficiency is ensured, thereby achieving the higher retrieval performance.

Figure 4:
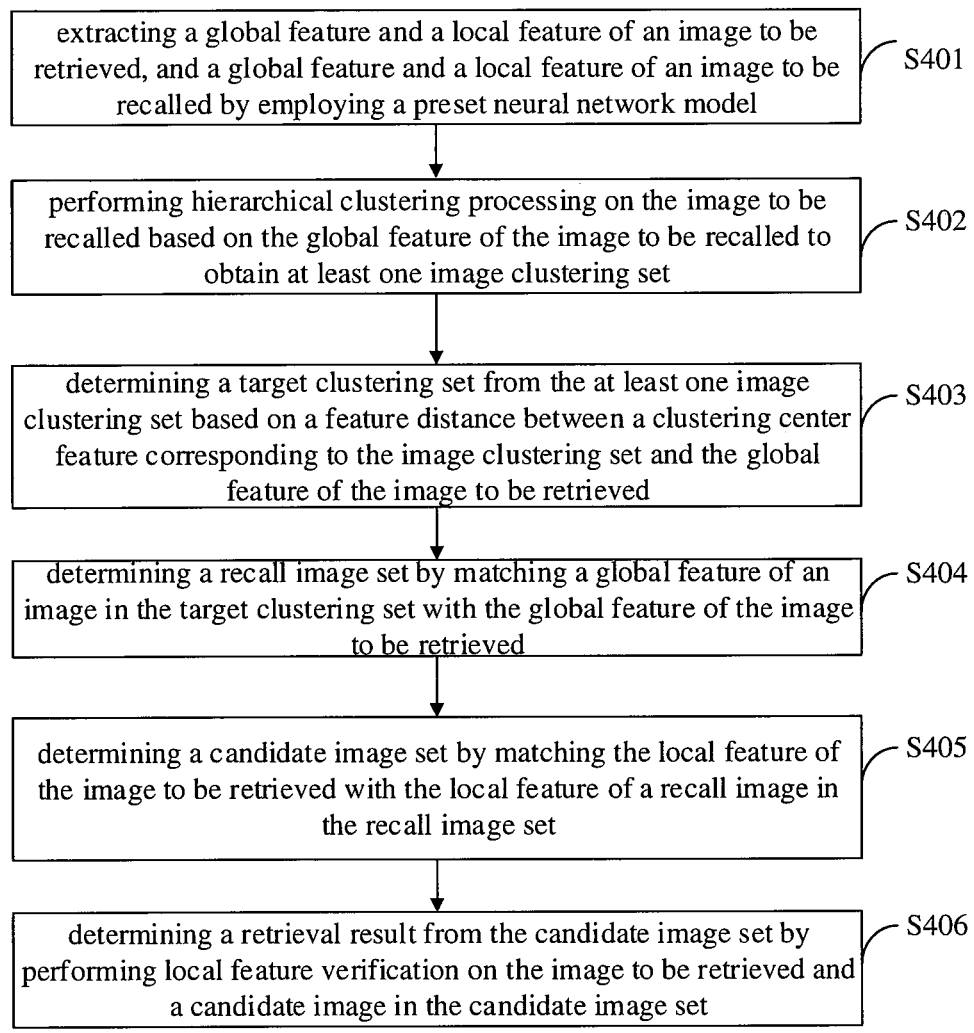
FIG. 4 is a flowchart illustrating a method for retrieving an image according to another embodiment of the disclosure.

FIG. 4 is a flowchart illustrating a method for retrieving an image according to another embodiment of the disclosure. The technical solution may be further optimized and expanded based on the above technical solution, and may be combined with the above alternative embodiments. As illustrated in FIG. 4, the method may include the followings.

At block S401, a global feature and a local feature of an image to be retrieved, and a global feature and a local feature of an image to be recalled are extracted by employing a preset neural network model.

At block S402, hierarchical clustering processing is performed on the image to be recalled based on the global feature of the image to be recalled to obtain at least one image clustering set.

The hierarchical clustering processing refers to performing multi-level clustering on the global feature distribution of the image to be recalled, which facilitates to improve the speed of the image retrieval. The hierarchical clustering processing includes, but is not limited to, employing a two-level Kmeans clustering algorithm. By performing the two-level Kmeans clustering, an image clustering result may be more uniform, and the retrieval effect and the efficiency may be accelerated. For example, a large number of images to be recalled are clustered by employing the two-level kmeans algorithm based on the global features of the images to be recalled. First, 200 primary codebook centers are clustered, and each primary codebook center has 200 secondary centers for the second-level clustering.

At block S403, a target clustering set is determined from the at least one image clustering set based on a feature distance between a clustering center feature corresponding to the image clustering set and the global feature of the image to be retrieved.

For example, the image clustering set with the clustering center feature having the feature distance from the global feature of the image to be retrieved lower than a feature distance threshold may be determined as the target clustering set. The image clustering set with a clustering center closest to the feature of the image to be retrieved is preferred as the target clustering set. The closer the distance between the clustering center feature and the feature of the image to be retrieved, the greater the probability that the image in the image clustering set is the same or similar to the image to be retrieved.

At block S404, the recall image set is determined by matching a global feature of an image in the target clustering set with the global feature of the image to be retrieved.

Global feature matching is performed on an image in the target clustering set and the image to be retrieved after the target clustering set is selected, thereby reducing the number of images participating in the global feature matching, improving the speed of the image retrieval, and ensuring the real-time retrieval.

Moreover, the global image of the image to be recalled may be compressed before the hierarchical clustering processing is performed on the image to be recalled, thereby reducing the storage space of the global feature, reducing the time consumption of the global feature matching, further improving the retrieval speed and optimizing the retrieval performance.

At block S405, a candidate image set is determined by matching t the local feature of the image to be retrieved with the local feature of a recall image in the recall image set.

At block S406, a retrieval result is determined from the candidate image set by performing local feature verification on the image to be retrieved and a candidate image in the candidate image set.

According to the technical solution of embodiments of the disclosure, during the image retrieval, both the global feature and the local feature of the image are extracted by employing the preset neural network model. The hierarchical clustering processing is performed on the image to be recalled based on the global feature of the image. The preliminary image retrieval result is obtained by considering both the global feature and the local feature of the image based on the clustering result. The final image retrieval result is obtained by performing the local feature verification on the image. In this way, a problem that the accuracy of the existing image retrieval is low is solved. The accuracy of the image retrieval for a large number of database images is improved. The retrieval speed is further accelerated by the hierarchical clustering processing. The real-time performance of the image retrieval is ensured. The higher retrieval performance is further achieved.

Figure 5:
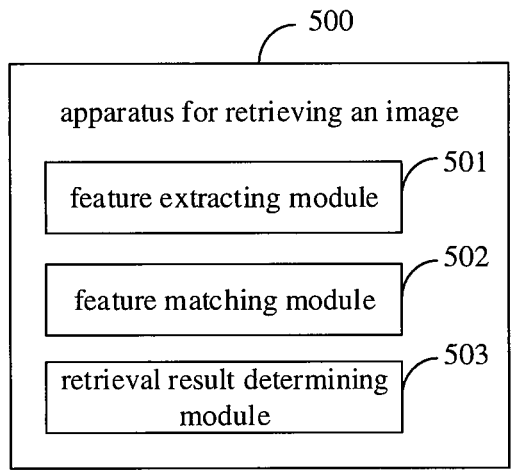
FIG. 5 is a block diagram illustrating an apparatus for retrieving an image according to an embodiment of the disclosure.

FIG. 5 is a block diagram illustrating an apparatus for retrieving an image according to an embodiment of the disclosure. The embodiment of the disclosure may be applied to a situation where image retrieval or search is performed based on a request image inputted by the user. The apparatus may be implemented by software and/or hardware, and integrated in any electronic device with numeracy, such as a server.

As illustrated in FIG. 5, the apparatus 500 for retrieving the image according to the embodiment of the disclosure may include: a feature extracting module 501, a feature matching module 502, and a retrieval result determining module 503.

The feature extracting module 501 is configured to extract a global feature and a local feature of an image to be retrieved, and a global feature and a local feature of an image to be recalled by employing a preset neural network model.

The feature matching module 502 is configured to determine a candidate image set by matching the global feature of the image to be retrieved with the global feature of the image to be recalled and matching the local feature of the image to be retrieved with the local feature of the image to be recalled.

The retrieval result determining module 503 is configured to determine a retrieval result from the candidate image set by performing local feature verification on the image to be retrieved and a candidate image in the candidate image set.

In some embodiments, the feature extracting module 501 includes: a global feature extracting unit and a local feature extracting unit.

The global feature extracting unit is configured to extract the global feature of the image to be retrieved and the global feature of the image to be recalled by employing a residual neural network model.

The local feature extracting unit is configured to extract the local feature of the image to be retrieved and the local feature of the image to be recalled by employing the residual neural network model and an attention model.

In some embodiments, an output layer of the residual neural network model is taken as an input layer of the attention model during extracting the local feature of the image to be retrieved and the local feature of the image to be recalled.

In some embodiments, the retrieval result determining module 503 includes: a matching point determining unit, a transformation matrix determining unit, and a retrieval result determining unit.

The matching point determining unit is configured to determine feature matching points between the local feature of the image to be retrieved and a local feature of the candidate image in the candidate image set.

The transformation matrix determining unit is configured to determine a feature transformation matrix between the image to be retrieved and the candidate image based on a relative position relationship between the local feature of the image to be retrieved and the local feature of the candidate image.

The retrieval result determining unit is configured to determine the retrieval result from the candidate image set based on the number of feature matching points of the candidate image that satisfy the feature transformation matrix.

In some embodiments, the feature matching module 502 includes: a recall image set determining unit, and a candidate image set determining unit.

The recall image set determining unit is configured to determine a recall image set by matching the global feature of the image to be retrieved with the global feature of the image to be recalled.

The candidate image set determining unit is configured to determine the candidate image set by matching the local feature of the image to be retrieved with a local feature of a recall image in the recall image set.

In some embodiments, the recall image set determining unit includes: a clustering processing subunit, a target clustering set determining subunit, and a recall image set determining subunit.

The clustering processing subunit is configured to perform hierarchical clustering processing on the image to be recalled based on the global feature of the image to be recalled to obtain at least one image clustering set.

The target clustering set determining subunit is configured to determine a target clustering set from the at least one image clustering set based on a feature distance between a clustering center feature corresponding to the image clustering set and the global feature of the image to be retrieved.

The recall image set determining subunit is configured to determine the recall image set by matching a global feature of an image in the target clustering set with the global feature of the image to be retrieved.

In some embodiments, the feature matching module 502 also includes: a feature compressing unit. The feature compressing unit is configured to compress the global feature of the image to be retrieved and the global feature of the image to be recalled before the recall image set determining unit determines the recall image set by matching the global feature of the image to be retrieved with the global feature of the image to be recalled.

The apparatus 500 for retrieving the image according to the embodiment of the disclosure may execute the method for retrieving the image according to any one of embodiments of the disclosure, and have corresponding functional modules and beneficial effects of the method. Contents not described in detail in the apparatus embodiment of the disclosure may refer to the description in any method embodiment of the disclosure.

According to embodiments of the disclosure, the disclosure also provides an electronic device and a readable storage medium.

Figure 6:
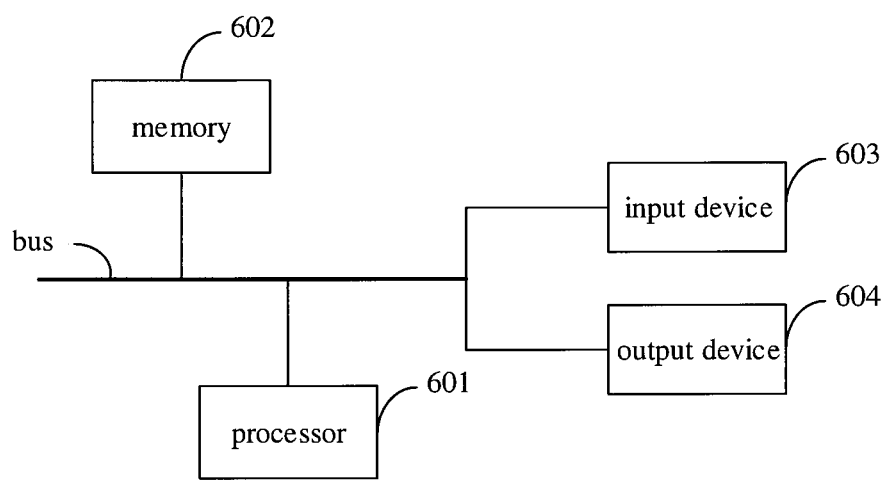
FIG. 6 is a block diagram illustrating an electronic device according to an embodiment of the disclosure.

As illustrated in FIG. 6, FIG. 6 is a block diagram illustrating an electronic device capable of implementing a method for retrieving an image according to embodiments of the disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the implementation of the disclosure described and/or claimed herein.

As illustrated in FIG. 6, the electronic device includes: one or more processors 601, a memory 602, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 6, a processor 601 is taken as an example.

The memory 602 is a non-transitory computer readable storage medium provided by the disclosure. The memory is configured to store instructions executable by at least one processor, to enable the at least one processor to execute the method for retrieving the image provided by the disclosure. The non-transitory computer readable storage medium provided by the disclosure is configured to store computer instructions. The computer instructions are configured to enable a computer to execute the method for retrieving the image provided by the disclosure.

As the non-transitory computer readable storage medium, the memory 602 may be configured to store non-transitory software programs, non-transitory computer executable programs and modules, such as program instructions/module (such as the feature extracting module 501, the feature matching module 502, and the retrieval result determining module 503 illustrated in FIG. 5) corresponding to the method for retrieving the image according to embodiments of the disclosure. The processor 601 is configured to execute various functional applications and data processing of the server by operating non-transitory software programs, instructions and modules stored in the memory 602, that is, implements the method for retrieving the image according to the above method embodiments.

The memory 602 may include a storage program region and a storage data region. The storage program region may store an application required by an operating system and at least one function. The storage data region may store data created according to predicted usage of the electronic device based on the semantic representation. In addition, the memory 602 may include a high-speed random access memory, and may also include a non-transitory memory, such as at least one disk memory device, a flash memory device, or other non-transitory solid-state memory device. In some embodiments, the memory 602 may optionally include memories remotely located to the processor 601, and these remote memories may be connected to the electronic device via a network. Examples of the above network include, but are not limited to, an Internet, an intranet, a local area network, a mobile communication network and combinations thereof.

The electronic device capable of implementing the method for retrieving the image may also include: an input device 603 and an output device 604. The processor 601, the memory 602, the input device 603, and the output device 604 may be connected via a bus or in other means. In FIG. 6, the bus is taken as an example.

The input device 603 may receive inputted digital or character information, and generate key signal input related to user setting and function control of the electronic device capable of implementing the method for detecting the mobile traffic light, such as a touch screen, a keypad, a mouse, a track pad, a touch pad, an indicator stick, one or more mouse buttons, a trackball, a joystick and other input device. The output device 604 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other.

With the technical solution according to embodiments of the disclosure, during the image retrieval, both the global feature and the local feature of the image are extracted by employing the preset neural network model. The preliminary image retrieval result is obtained based on the global feature and the local feature. Then, the final image retrieval result is obtained by performing the local feature verification on the image. In this way, a problem that the accuracy of the existing image retrieval is low is solved. For a large number of database images, the accuracy of the image retrieval is improved while the retrieval efficiency is ensured.

It should be understood that, steps may be reordered, added or deleted by utilizing flows in the various forms illustrated above. For example, the steps described in the disclosure may be executed in parallel, sequentially or in different orders, so long as desired results of the technical solution disclosed in the disclosure may be achieved, there is no limitation here.

The above detailed implementations do not limit the protection scope of the disclosure. It should be understood by the skilled in the art that various modifications, combinations, sub-combinations and substitutions may be made based on design requirements and other factors. Any modification, equivalent substitution and improvement made within the spirit and the principle of the disclosure shall be included in the protection scope of disclosure.

What is claimed is:

1. A method for retrieving an image, comprising:
   extracting a global feature and a local feature of a query image, and a global feature and a local feature of an image to be recalled by employing a preset neural network model;
   determining a candidate image set by matching the global feature of the query image with the global feature of the image to be recalled and matching the local feature of the query image with the local feature of the image to be recalled; and
   determining a retrieval result from the candidate image set by performing local feature verification on the query image and a candidate image in the candidate image set;
   wherein the determining the candidate image set by matching the global feature of the query image with the global feature of the image to be recalled and matching the local feature of the query image with the local feature of the image to be recalled comprises:
   determining a recall image set by matching the global feature of the query image with the global feature of the image to be recalled; and
   determining the candidate image set by matching the local feature of the query image with a local feature of a recall image in the recall image set.

2. The method of claim 1, wherein the extracting the global feature and the local feature of the query image and the global feature and the local feature of the image to be recalled by employing a preset neural network model comprises:
   extracting the global feature of the query image and the global feature of the image to be recalled by employing a residual neural network model; and
   extracting the local feature of the query image and the local feature of the image to be recalled by employing the residual neural network model and an attention model.

3. The method of claim 2, wherein an output layer of the residual neural network model is taken as an input layer of the attention model during extracting the local feature of the query image and the local feature of the image to be recalled.

4. The method of claim 1, wherein the determining the retrieval result from the candidate image set by performing the local feature verification on the query image and the candidate image in the candidate image set comprises:
   determining feature matching points between the local feature of the query image and a local feature of the candidate image in the candidate image set;
   determining a feature transformation matrix between the query image and the candidate image based on a relative position relationship between the local feature of the query image and the local feature of the candidate image; and
   determining the retrieval result from the candidate image set based on the number of feature matching points of the candidate image that satisfy the feature transformation matrix.

5. The method of claim 1, wherein the determining the recall image set by matching the global feature of the query image with the global feature of the image to be recalled comprises:
   performing hierarchical clustering processing on the image to be recalled based on the global feature of the image to be recalled to obtain at least one image clustering set;
   determining a target clustering set from the at least one image clustering set based on a feature distance between a clustering center feature corresponding to the image clustering set and the global feature of the query image; and
   determining the recall image set by matching a global feature of an image in the target clustering set with the global feature of the query image.

6. The method of claim 1, further comprising:
   compressing the global feature of the query image and the global feature of the image to be recalled.

7. An electronic device, comprising:
   at least one processor; and
   a memory, communicatively coupled to the at least one processor,
   wherein the memory is configured to store instructions executable by the at least one processor, and when the instructions are executed by the at least one processor, the at least one processor is caused to execute the method for retrieving the image comprising:
   extracting a global feature and a local feature of a query image, and a global feature and a local feature of an image to be recalled by employing a preset neural network model;

determining a candidate image set by matching the global feature of the query image with the global feature of the image to be recalled and matching the local feature of the query image with the local feature of the image to be recalled; and determining a retrieval result from the candidate image set by performing local feature verification on the query image and a candidate image in the can image set;

wherein the determining the candidate image set by matching the global feature of the query image with the global feature of the image to be recalled and matching the local feature of the query image with the local feature of the image to be recalled comprises:

determining a recall image set by matching the global feature of the query image with the global feature of the image to be recalled; and determining the candidate image set by matching the local feature of the query image with a local feature of a recall image in the recall image set.

8. The electronic device of claim 7, wherein the extracting the global feature and the local feature of the query image and the global feature and the local feature of the image to be recalled by employing a preset neural network model comprises:

extracting the global feature of the query image and the global feature of the image to be recalled by employing a residual neural network model; and extracting the local feature of the query image and the local feature of the image to be recalled by employing the residual neural network model and an attention model.

9. The electronic device of claim 8, wherein an output layer of the residual neural network model is taken as an input layer of the attention model during extracting the local feature of the query image and the local feature of the image to be recalled.

10. The electronic device of claim 7, wherein the determining the retrieval result from the candidate image set by performing the local feature verification on the query image and the candidate image in the candidate image set comprises:

determining feature matching points between the local feature of the query image and a local feature of the candidate image in the candidate image set;

determining a feature transformation matrix between the image to be query image and the candidate image based on a relative position relationship between the local feature of the query image and the local feature of the candidate image; and determining the retrieval result from the candidate image set based on the number of feature matching points of the candidate image that satisfy the feature transformation matrix.

11. The electronic device of claim 7, wherein the determining the recall image set by matching the global feature of the query image with the global feature of the image to be recalled comprises:

performing hierarchical clustering processing on the image to be recalled based on the global feature of the image to be recalled to obtain at least one image clustering set;

determining a target clustering set from the at least one image clustering set based on a feature distance between a clustering center feature corresponding to the image clustering set and the global feature of the query image; and determining the recall image set by matching a global feature of an image in the target clustering set with the global feature of the query image.

12. The electronic device of claim 7, wherein the at least one processor is caused to further implement an operation of:

compressing the global feature of the query image and the global feature of the image to be recalled.

13. A non-transitory computer readable storage medium having computer instructions stored thereon, wherein the computer instructions are configured to cause a computer to execute the method for retrieving the image comprising:

extracting a global feature and a local feature of a query image, and a global feature and a local feature of an image to be recalled by employing a preset neural network model;

determining a candidate image set by matching the global feature of the query image with the global feature of the image to be recalled and matching the local feature of the query image with the local feature of the image to be recalled; and determining a retrieval result from the candidate image set by performing local feature verification on the query image and a candidate image in the candidate image set;

wherein the determining the candidate image set by matching the global feature of the query image with the global feature of the image to be recalled and matching the local feature of the query image with the local feature of the image to be recalled comprises:

determining a recall image set by matching the global feature of the query image with the global feature of the image to be recalled; and determining the candidate image set by matching the local feature of the query image with a local feature of a recall image in the recall image set.

14. The storage medium of claim 13, wherein the extracting the global feature and the local feature of the query image and the global feature and the local feature of the image to be recalled by employing a preset neural network model comprises:

extracting the global feature of the query image and the global feature of the image to be recalled by employing a residual neural network model; and extracting the local feature of the query image and the local feature of the image to be recalled by employing the residual neural network model and an attention model.

15. The storage medium of claim 14, wherein an output layer of the residual neural network model is taken as an input layer of the attention model during extracting the local feature of the query image and the local feature of the image to be recalled.

16. The storage medium of claim 13, wherein the determining the retrieval result from the candidate image set by performing the local feature verification on the query image and the candidate image in the candidate image set comprises:

determining feature matching points between the local feature of the query image and a local feature of the candidate image in the candidate image set;

determining a feature transformation matrix between the query image and the candidate image based on a relative position relationship between the local feature of the query image and the local feature of the candidate image; and determining the retrieval result from the candidate image set based on the number of feature matching points of the candidate image that satisfy the feature transformation matrix.

17. The storage medium of claim 13, wherein the determining the recall image set by matching the global feature of the query image with the global feature of the image to be recalled comprises:
  performing hierarchical clustering processing on the image to be recalled based on the global feature of the image to be recalled to obtain at least one image clustering set;
  determining a target clustering set from the at least one image clustering set based on a feature distance between a clustering center feature corresponding to the image clustering set and the global feature of the query image; and
  determining the recall image set by matching a global feature of an image in the target clustering set with the global feature of the query image.

* * * * *